US011762210B1

(12) United States Patent
Moczydlowski

(10) Patent No.: US 11,762,210 B1
(45) Date of Patent: Sep. 19, 2023

(54) MANAGEMENT OF ELONGATED STRUCTURES FOR HEAD MOUNTED DEVICE

(71) Applicant: Meta Platforms Technologies, LLC, Menlo Park, CA (US)

(72) Inventor: Seth Moczydlowski, Austin, TX (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/967,411

(22) Filed: Oct. 17, 2022

(51) Int. Cl.
    *G02B 27/01* (2006.01)
(52) U.S. Cl.
    CPC ..... *G02B 27/0176* (2013.01); *G02B 27/0172* (2013.01)
(58) Field of Classification Search
    CPC .......... G02B 27/0176; G02B 27/0172
    See application file for complete search history.

(56) References Cited

U.S. PATENT DOCUMENTS

| 6,448,944 | B2 | 9/2002 | Ronzani et al. | |
|---|---|---|---|---|
| 7,773,767 | B2 | 8/2010 | Wahl et al. | |
| 8,643,568 | B2 | 2/2014 | West et al. | |
| 9,733,481 | B2 | 8/2017 | Carollo et al. | |
| 2009/0168131 | A1* | 7/2009 | Yamaguchi | G02B 27/0176 359/9 |
| 2020/0355926 | A1* | 11/2020 | Williams | G02B 27/0176 |
| 2021/0080996 | A1 | 3/2021 | Hudman et al. | |

* cited by examiner

*Primary Examiner* — Robert J Michaud
(74) *Attorney, Agent, or Firm* — Lee & Hayes, P.C.

(57) ABSTRACT

A wearable device includes a front portion configured to engage a front portion of a head of a user, and a rear portion configured to engage a rear portion of the head of the user. The rear portion includes a telescoping arm guide, a telescoping arm slidably coupled to the telescoping arm guide such that the telescoping arm is moveable relative to the telescoping arm guide, a cable guide coupled to the telescoping arm guide, and a connector. The device includes an optical fiber coupled to the telescoping arm at a first point, coupled to the connector at a second point, and slidably coupled to the cable guide between the first point and the second point, such that the optical fiber includes a medial portion between the first point and the second point, the medial portion including a bend that is greater than or equal to a minimum bend radius.

20 Claims, 8 Drawing Sheets

MANAGEMENT OF ELONGATED STRUCTURES FOR HEAD MOUNTED DEVICE

BACKGROUND

Recent years have seen significant advancement in extended reality experiences. Additionally, electronic devices that provide such experiences continue to develop. Furthermore, such devices are often implemented as wearable devices, where the electronic device is worn by or attached to the user. In such implementations, user comfort is crucial, while maintaining electronic device performance. Electronic components of such devices may be implemented in flexible environments and/or may be distributed throughout a device instead of being located in a central housing. However, the distribution of electronic components requires the use of fibers, cables, circuits, wires, traces, or other flexible, elongated structures to be implemented in complex geometries of the device and/or in flexible portions of the device. Such elongated structures may be damaged in complex or flexible geometries if improperly managed.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
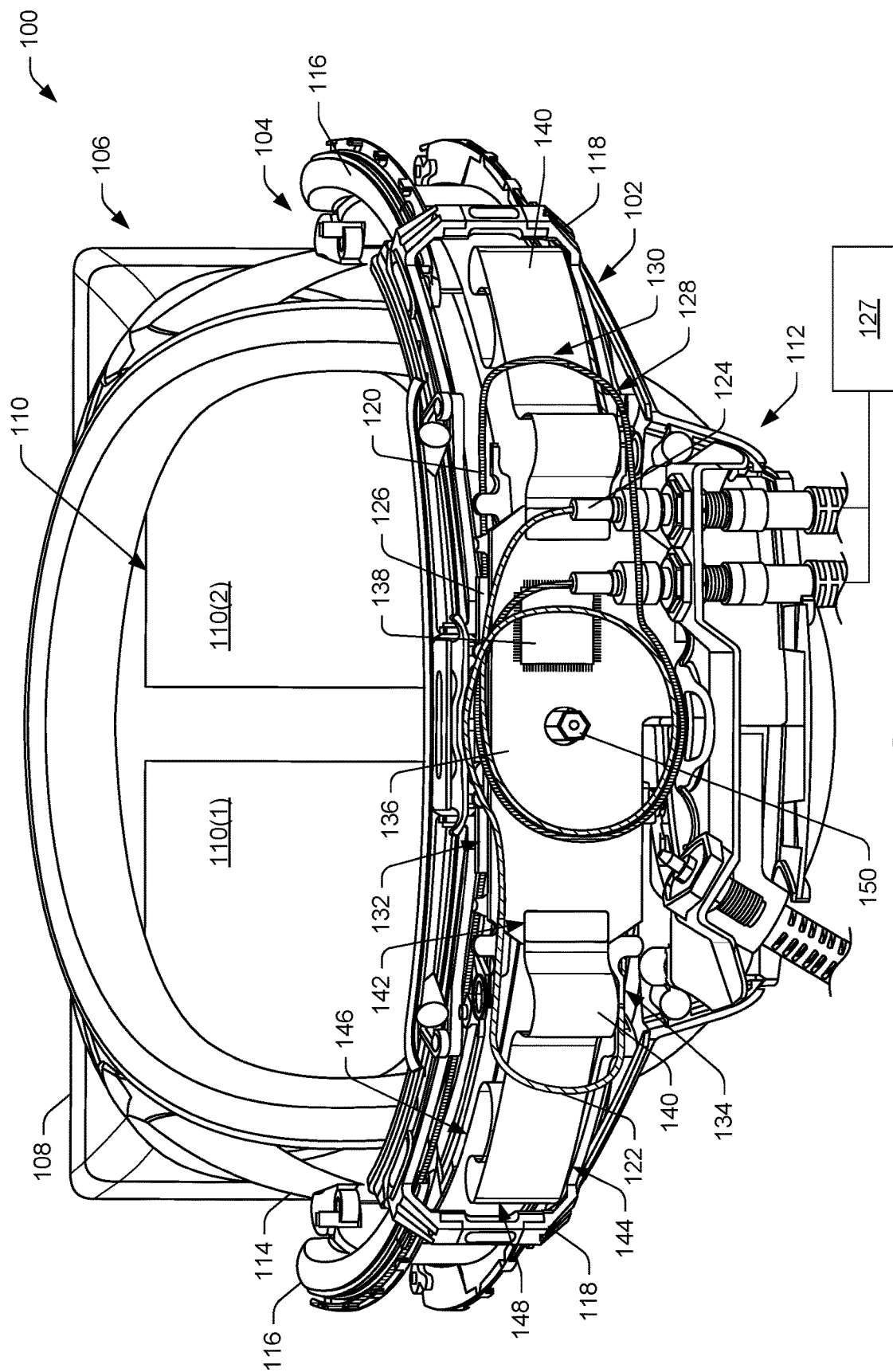
FIG. 1 illustrates a back perspective view of an example electronic device, with portions of a housing removed to expose an adjustable frame usable to manage elongated structures of the electronic device, the adjustable frame being shown in a first state in accordance with an example of the present disclosure.

Wearable devices are often used to provide extended reality experiences. As wearable electronic devices continue to develop, solutions to maximize user comfort, while maintaining device performance become increasingly important to provide an overall positive user experience. In some devices, electronic components may be distributed throughout the device instead of being located in a central housing. Additionally, or alternatively, the electronic components may be implemented in complex geometries of the device and/or in flexible portions of the device. Furthermore, with electronic components being implemented in complex geometries and/or in flexible environments, components such as fibers (e.g., optical fibers), wires, circuits, traces, straps, cables, or other flexible, elongated structures (referred to collectively herein as "flexible elongated structures" or simply "elongated structures") may be damaged or may bind or become tangled if improperly managed.

This application describes an electronic device having an adjustable frame. The electronic device also includes a hardware management system integrated within at least a portion of the adjustable frame to manage flexible, elongated structures of the electronic device such as fibers, cables, wires, circuits, traces, straps, etc. of the electronic device. The hardware management system may protect the elongated structures from experiencing damage. For example, the hardware management system may maintain a minimum bend radius along one or more cables, circuitry, wires, or other elongated structures. As described herein, the minimum bend radius represents the smallest radius that a cable, circuit, wire, or other elongated structures are allowed to be bent. Furthermore, the hardware management system may prevent tangling or binding of the elongated structures of the electronic device.

In some examples, different types of elongated structures may include different minimum bend radii. For example, an optical fiber (or a fiber optic cable) may include a first minimum bend radius, while a flex circuit may include a second minimum bend radius. In some examples, the first minimum bend radius may be greater than the second minimum bend radius. However, in some examples, the second minimum bend radius may be greater than the first minimum bend radius. In some examples, the minimum bend radius may protect a structure and/or function of the elongated structures. Additionally, or alternatively, the minimum bend radius may prevent the elongated structures from becoming tangled or binding.

For example, with respect to an optical fiber (or a fiber optic cable) a minimum bend radius may protect the optical fiber from being damaged and may ensure that light signals are able to be conveyed along the optical fiber. In another example, a minimum bend radius may protect traces of a flexible circuit to ensure that the flexible circuit is able to conduct electrical signals along the flexible circuit.

In some examples, the hardware management system may be included in a wearable headset device, or other face or head mounted device. The adjustable frame and the hardware management system may allow the headset to be comfortably shaped to accommodate a head of a user, while protecting elongated structures of the electronic device. For example, the headset may include an adjustable frame that includes various structures and guides configured to maintain one or more minimum bend radii of various elongated structures of the electronic device.

In some examples, the hardware management system may be used in electronic devices such as, but not limited to, a head-mounted device (e.g., an electronic headset device, glasses, etc.) or other wearable device. Such head-mounted devices are referred to herein as "a headset" and may include extended reality headsets that allow users to view, create, consume, and share media content. In some examples, the headset may include a display structure having a display which is placed over eyes of a user and allows the user to "see" the extended reality. As discussed further below, the term "extended reality" includes virtual reality, mixed reality, and/or augmented reality.

As used herein, the term "virtual environment" or "extended reality environment" refers to a simulated environment in which users can fully or partially immerse themselves. For example, an extended reality environment can comprise virtual reality, augmented reality, mixed reality, etc. An extended reality environment can include objects and elements with which a user can interact. In many cases, a user participates in an extended reality environment using a computing device, such as a dedicated extended reality device. As used herein, the term "extended reality device" refers to a computing device having extended reality capabilities and/or features. In particular, an extended reality device can refer to a computing device that can include any device capable of presenting a full or partial extended reality environment.

Examples of wearable devices may include devices that may execute applications, operating system(s), output media content, provide connectivity to one or more other devices (e.g., via Wi-Fi, mobile networks, Bluetooth®, global positioning system (GPS), etc.), among other operations. The wearable device described herein may also include a display and output/input devices that allows users to view, create, consume, and share media content. Furthermore, the wearable device described herein may be connected to one or more other devices and may be configured to control one or more functions of the other devices based in part on user input received via the wearable device.

While describing the electronic device as providing an extended reality experience, it is to be understood that the electronic device described herein may include an adjustable frame having a hardware management system that protects elongated structures the electronic device. For example, the electronic device may include a head set, hard hat, helmet, hat, visor, face shield, etc.

In some examples, the electronic device may include a front portion that is configured to engage a front region of a head of a user. The front portion may include a housing having one or more electronic components of the electronic device disposed therein. For example, the front portion of the electronic device may include one or more displays disposed within the housing of the front portion of the electronic device. The one or more displays may be configured to output image data to the user when the electronic device is attached to the user. In some examples, the electronic device may include a left display and a right display configured to output image data to a left eye and a right eye of the user, respectively.

The electronic device further includes a rear portion that is configured to engage a rear region of the head of the user. In some examples, the rear portion may be coupled to the front portion via an intermediate portion of the electronic device. Alternatively, the rear portion may be coupled directly to the front portion. In some examples, the front portion, the intermediate portion, and the rear portion may form a frame of the electronic device. A size of the frame of the electronic device may be adjustable to accommodate the head of the user.

For example, the rear portion may include a telescoping arm guide and a telescoping arm slidably coupled to the telescoping arm guide such that the telescoping arm is moveable relative to the telescoping arm guide. In some examples, the electronic device may include a telescoping arm guide and telescoping arm on each of a first side of the electronic device and a second side of the electronic device. In some examples, a position of the telescoping arms is adjustable relative to the telescoping arm guides to change a size of the frame of the electronic device.

In some examples, the electronic device may include various elongated structures. For example, the electronic device may include an optical fiber (or a fiber optic cable). In some examples, the optical fiber may convey one or more signals to the one or more displays of the electronic device. The one or more signals may backlight the one or more displays and/or may provide data to be output by the one or more displays.

In some examples, the optical fiber may enter the rear portion of the electronic device via a connector and may be coupled thereto. The optical fiber may also extend from the rear portion to the front portion of the device where the optical fiber may be coupled to the display of the electronic device. In some examples, the electronic device may include a cable guide coupled to the telescoping arm guide. In such an example, the optical fiber may be slidably coupled to the cable guide. Furthermore, the optical fiber may be further coupled to the telescoping arm such that the optical fiber includes a medial portion having a bend located between the cable guide and the connector. The bend of the optical fiber may include a minimum bend radius. In some examples, the minimum bend radius of the optical fiber may be between approximately 5 millimeters (mm) and approximately 20 mm, between approximately 7 mm and approximately 17 mm, or between approximately 10 mm and approximately 15 mm.

In some examples, the electronic device is adjustable between at least a first state and a second state. In a first state, the telescoping arm may be in a first position such that the medial portion of the optical fiber includes a first length, and the bend of the optical fiber includes a radius that is equal to or greater than the minimum bend radius. In a second state, the telescoping arm may be in a second position (that is different than the first position), such that the medial portion includes a second length (that is different than the first length), and the bend of the optical fiber includes a radius that is equal to or greater than the minimum bend radius. As such, a size of the frame of the electronic device may be adjusted while maintaining a minimum bend radius of the optical fiber.

In some examples, the electronic device may include a printed circuit board (PCB) disposed in the rear portion of the electronic device. The PCB may include one or more electronic components coupled thereto. Furthermore, the electronic device may include a flexible circuit coupled to the PCB at a first end of the flexible circuit and electrically coupled to the one or more electronic components. The flexible circuit may include a second end that is coupled to the telescoping arm. Additionally, or alternatively, the electronic device may include a PCB disposed within the intermediate portion of the electronic device. In such an example, the flexible circuit may be coupled to the PCB disposed within the intermediate portion instead of or in addition to the telescoping arm. In some examples, the PCB disposed within the intermediate portion may include one or more electronic components that are configured to receive data via the flexible circuit and provide data to be output by the electronic device.

In some examples, the flexible circuit includes a first portion and a second portion disposed at least partially within the rear portion of the electronic device. The second portion may at least partially overlap the first portion and the second portion may be configured to move relative to the first portion as the telescoping arm moves relative to the telescoping arm guide. In such a configuration, the flexible circuit includes a bend disposed between the first portion and the second portion. The bend may include a radius that is equal to or greater than a minimum bend radius. In some examples, the minimum bend radius of the flexible circuit may be substantially different than the minimum bend radius of the optical fiber. However, in some examples, the minimum bend radius of the flexible circuit may be substantially similar to the minimum bend radius of the optical fiber. In some examples, the minimum bend radius of the flexible circuit may be between approximately 1 mm and approximately 10 mm, between approximately 1.5 mm and approximately 8 mm, or between approximately 2 mm and approximately 6 mm.

In some examples, the electronic device may include a flexible circuit guide configured to support at least a portion of the first portion of the flexible circuit. The electronic device may further include a flexible circuit clamp coupled to the flexible circuit guide and configured to restrict movement of the flexible circuit between the flexible circuit guide and the flexible circuit clamp. In some examples, the flexible circuit clamp includes a rounded portion configured to accommodate the bend of the flexible circuit.

FIG. 1 illustrates a back perspective view of an example electronic device 100. The electronic device 100 may comprise a headset that is wearable by a user to provide and extended reality experience. For example, the electronic device 100 may be secured to a head of a user and may output content to the user. The electronic device 100 includes a hardware management system 102 that may be integrated within at least a portion of a frame 104 of the electronic device. The hardware management system 102 may be configured to manage elongated structures of the electronic device 100. As used herein, elongated structures may refer to cables, wires, circuitry, or other hardware of the electronic device 100.

The hardware management system 102 may protect the elongated structures from experiencing damage. For example, the hardware management system 102 may maintain a minimum bend radius along one or more cables, circuitry, wires, or other elongated structures. As described herein, the minimum bend radius represents the smallest radius that a cable, circuit, wire, or other elongated structures are allowed to be bent. Furthermore, the hardware management system 102 may prevent binding and/or tangling of the elongated structures.

In some examples, the electronic device 100 includes a front portion 106 that is configured to engage a front region of a head of a user. The front portion 106 may include a housing 108 having one or more electronic components of the electronic device 100 disposed therein. For example, the front portion 106 of the electronic device 100 may include one or more displays 110 disposed within the housing 108 of the electronic device 100. The one or more displays 110 may be configured to output image data to the user when the electronic device 100 is attached to the user. In some examples, the electronic device 100 may include a left display 110(1) and a right display 110(2) configured to output image data to a left eye and a right eye of the user, respectively.

The electronic device 100 further includes a rear portion 112 that is configured to engage a rear region of the head of the user. In some examples, the rear portion 112 may be coupled to the front portion 106 via an intermediate portion 114 (shown and described further herein with respect to FIG. 8) of the electronic device 100. Alternatively, the rear portion 112 may be coupled directly to the front portion 106. In some examples, the front portion 106, the intermediate portion 114, and the rear portion 112 may form the frame 104 of the electronic device. A size of the frame 104 of the electronic device 100 may be adjustable to accommodate the head of the user.

For example, the rear portion 112 of the electronic device 100 may include a telescoping arm 116 and a telescoping arm guide 118. The telescoping arm 116 is slidably coupled to the telescoping arm guide 118 such that the telescoping arm 116 is moveable relative to the telescoping arm guide 118. In some examples, the electronic device 100 may include a telescoping arm 116 and telescoping arm guide 118 on each of a first side (e.g., a left side) of the electronic device 100 and a second side (e.g., a right side) of the electronic device 100. In some examples, a position of the telescoping arms 116 is adjustable relative to their respective telescoping arm guides 118 to change a size (e.g., a circumference) of the frame 104 of the electronic device 100.

In some examples, the electronic device 100 may include various elongated structures. For example, the electronic device 100 may include an optical fiber 120 (or a fiber optic cable). In some examples, the optical fiber 120 may convey one or more signals to the one or more displays 110 of the electronic device 100. The one or more signals may backlight the one or more displays 110 and/or may provide data to be output by the one or more displays 110. In some examples, the optical fiber 120 may be a first optical fiber 120 that is coupled to the left display 110(1) and the electronic device 100 includes a second optical fiber 122 that is coupled to the right display 110(2). The optical fibers 120 and 122 may include substantially similar, but rotationally patterned, routing through the electronic device 100. For example, the optical fibers 120 and 122 are rotationally patterned 180 degrees opposite each other around an adjustment mechanism (e.g., adjustment mechanism 150 described further herein below). Such rotational patterning of the optical fibers 120 and 122 may prevent the optical fiber paths from intersecting. Furthermore, in some examples, the routing of the optical fibers 120 and 122 may be substantially mirrored. As such, the routing of the optical fibers 120 and 122 is described with respect to the first optical fiber 120.

In some examples, the optical fiber 120 may enter the rear portion 112 of the electronic device 100 via a connector 124 and may be coupled thereto. The connector 124 may connect the optical fiber 120 to a signal source 127 that provides one or more signals to the optical fiber 120 which conveys the one or more signals to the display 110. The optical fiber 120 may also extend from the rear portion 112 to the front portion 106 of the electronic device 100 where the optical fiber 120 may be coupled to the display 110 of the electronic device 100.

In some examples, the electronic device 100 may include a cable guide 126 coupled to the telescoping arm guide 118. In such an example, the optical fiber 120 may be slidably coupled to the cable guide 126. The cable guide 126 may be formed from a relatively low friction polymer that allows the optical fiber 120 to move in at least one direction (e.g., along an axis of the optical fiber), while the cable guide 126 directs the movement of the optical fiber 120 in the at least one direction. The polymer may include polyoxymethylene (POM) or other low friction polymer.

In some examples, the optical fiber 120 may be further coupled to the telescoping arm 116 and/or the front portion 106 of the electronic device 100. Additionally, and as mentioned previously, the optical fiber 120 may be coupled to the connector 124. In such a configuration, the optical fiber 120 may include a medial portion 128 of the optical fiber 120. The medial portion 128 may include a segment of the optical fiber 120 that is disposed between the cable guide 126 and the connector 124. As described further herein, a length of the medial portion 128 may change based on a position of the telescoping arm 116.

In some examples, the medial portion 128 of the optical fiber 120 may include a bend 130 formed in the medial portion 128. The bend 130 is also located between the cable guide 126 and the connector 124 and the cable guide 126 may ensure that the bend maintains a minimum bend radius, even as a length of the medial portion 128 changes. In some examples, the minimum bend radius of the optical fiber 120 may be between approximately 5 millimeters (mm) and approximately 20 mm, between approximately 7 mm and approximately 17 mm, or between approximately 10 mm and approximately 15 mm.

In some examples, the electronic device 100 is adjustable between various states (or various positions). As shown in FIG. 1, the electronic device 100 is in a first state where the telescoping arm 116 is in a first position such that the medial portion 128 of the optical fiber 120 includes a first length, and the bend 130 of the optical fiber 120 includes a radius that is equal to or greater than the minimum bend radius. As mentioned previously, the electronic device 100 may include multiple optical fibers 120 and 122. In some examples, a first optical fiber 120 may be slidably coupled to a top portion 132 of the cable guide 126, while a second optical fiber 122 may be slidable coupled to a bottom portion 134 of the cable guide 126. The cable guide 126 may ensure that the optical fibers 120 and 122 include a minimum bend radius such that the optical fibers 120 are 122 are not bent past the minimum bend radius.

In some examples, the electronic device 100 may include a printed circuit board 136 (PCB) disposed in the rear portion 112 of the electronic device. The PCB 136 may include one or more electronic components 138 coupled thereto. Furthermore, the electronic device 100 may include a flexible circuit 140 coupled to the PCB 136 at a first end 142 of the flexible circuit 140 and electrically coupled to the one or more electronic components 138. The flexible circuit 140 may include a second end (shown in FIG. 8) that is coupled to the telescoping arm 116. Additionally, or alternatively, the electronic device 100 may include another PCB disposed within the intermediate portion 114 of the electronic device 100. In such an example, the flexible circuit 140 may be coupled to the PCB (shown in FIG. 8) disposed within the intermediate portion 114 instead of or in addition to the telescoping arm 116. In some examples, the PCB disposed within the intermediate portion 114 may include one or more electronic components that are configured to receive data via the flexible circuit 140 and provide data to be output by the electronic device 100. In some examples, the electronic device 100 may include multiple flexible circuits 140 and 141 coupled the PCB 136 and to the telescoping arms 116 and/or the intermediate portion 114 of the electronic device 100.

In some examples, the flexible circuit 140 includes a first portion 144 and a second portion 146 disposed at least partially within the rear portion 112 of the electronic device 100. The second portion 146 may at least partially overlap the first portion 144 and the second portion 146 may be configured to move relative to the first portion 144 as the telescoping arm 116 moves relative to the telescoping arm guide 118. In such a configuration, the flexible circuit 140 includes at least one bend 148 disposed between the first portion 144 and the second portion 146. Additionally, or alternatively, the flexible circuit 140 may include multiple bends disposed between the first portion 144 and the second portion 146. In some examples, the second portion 146 of the flexible circuit 140 may include a first length when the electronic device 100 is in the first state.

The bend 148 may include a radius that is equal to or greater than a minimum bend radius. In some examples, the minimum bend radius of the flexible circuit 140 may be substantially different than the minimum bend radius of the optical fibers 120 and 122. However, in some examples, the minimum bend radius of the flexible circuit 140 may be substantially similar to the minimum bend radius of the optical fibers 120 and 122. In some examples, the minimum bend radius of the flexible circuit 140 may be between approximately 1 mm and approximately 10 mm, between approximately 1.5 mm and approximately 8 mm, or between approximately 2 mm and approximately 6 mm.

The electronic device 100 may also include and adjustment mechanism 150. In some examples, when rotated, the adjustment mechanism 150 may cause the telescoping arms 116 to move relative to the telescoping arm guides 118 in a direction toward or away from each other. Rotating the adjustment mechanism 150 may cause a size of the frame 104 to be adjusted. In some examples, the optical fibers 120 and 122 may be at least partially looped around the adjustment mechanism 150.

Figure 2:
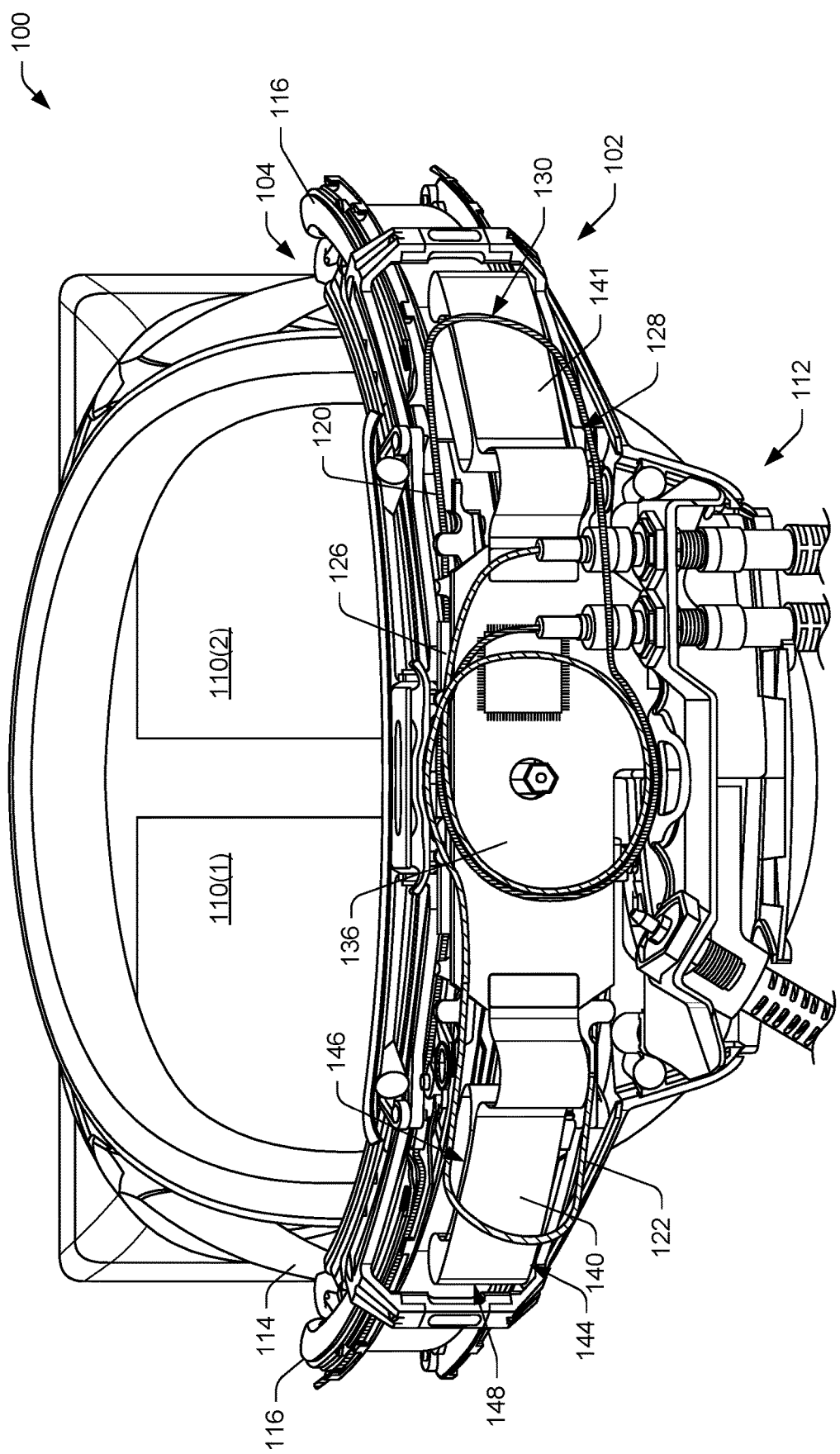
FIG. 2 illustrates a back perspective view of the example electronic device of FIG. 1 showing the adjustable frame in a second state.

FIG. 2 illustrates a back perspective view of the electronic device 100. As shown in FIG. 2, the electronic device 100 may be in a second state. In the second state, the telescoping arms 116 may be in a second position. In the second position, a size (e.g., a circumference) of the frame 104 of the electronic device 100 may be smaller in the second state than in the first state shown in FIG. 1. Furthermore, in the second position, the medial portion 128 may include a second length that is longer than the first length, as shown and described with respect to FIG. 1. As described previously, the electronic device 100 includes a cable guide 126 configured to guide movement of the optical fibers 120 and 122 as a position of the telescoping arms 116 is moved. As such, the cable guide 126 ensures that the bend 130 of the optical fibers 120 and 122 maintains the minimum bend radius.

Furthermore, the electronic device 100 includes one or more flexible circuits 140 and 141 that are coupled to the PCB 136 of the electronic device 100. In some examples, in the second state, the second portion 146 of the flexible circuit 140 may include a second length that is greater than the first length of the second portion 146 of the flexible circuit 140 when the electronic device 100 is in the first state. In some examples, the first portion 144 of the flexible circuit 140 may maintain a substantially consistent length, even as the second portion 146 changes lengths as a position of the telescoping arms 116 changes. In such a configuration, the flexible circuit 140 includes at least one bend 148 disposed between the first portion 144 and the second portion 146. Additionally, or alternatively, the flexible circuit 140 may include multiple bends disposed between the first portion 144 and the second portion 146. The one or more bends 148 may include a radius that is equal to or greater than a minimum bend radius of the flexible circuit.

Figure 3:
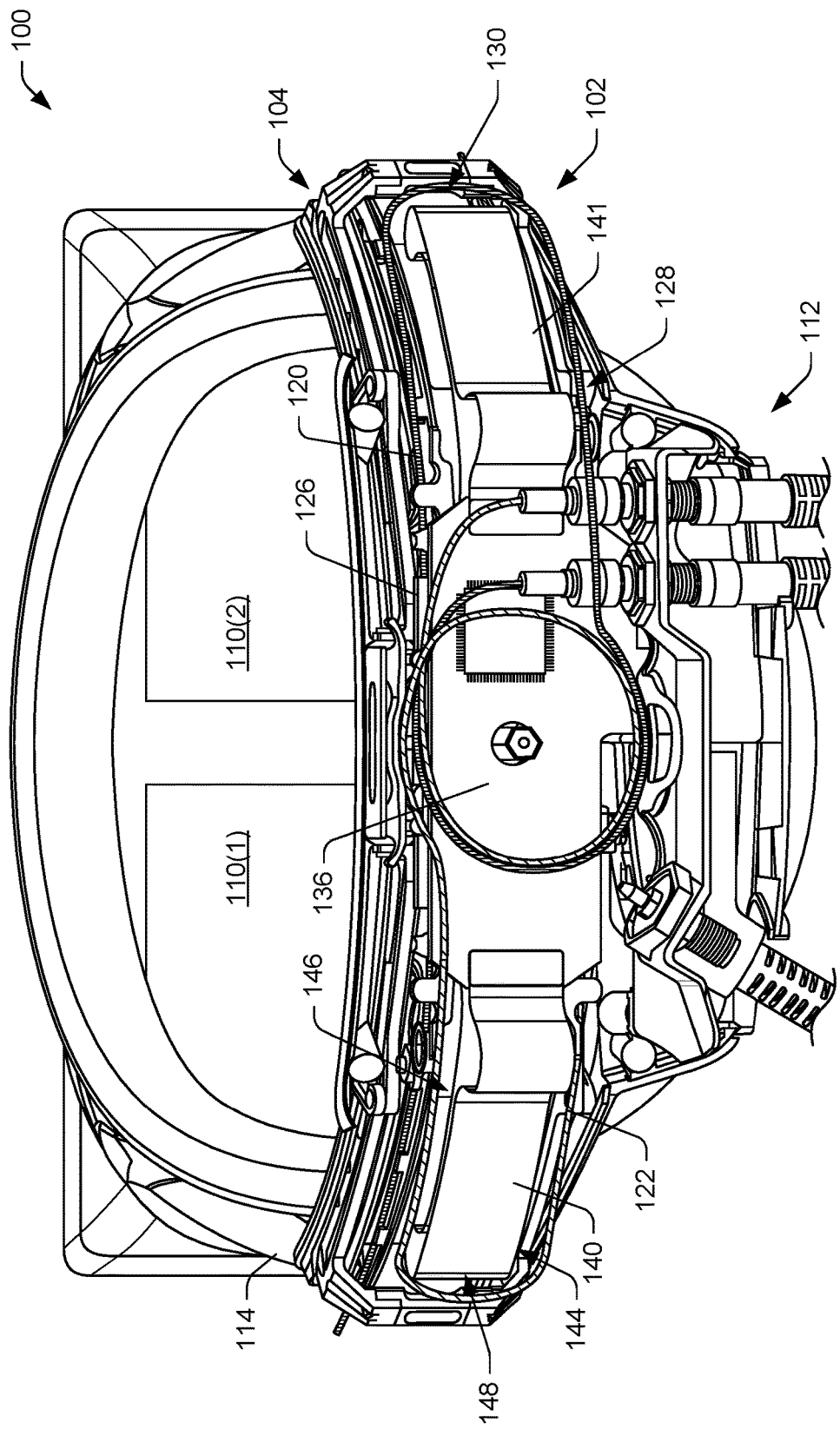
FIG. 3 illustrates a back perspective view of the example electronic device of FIG. 1 showing the adjustable frame in a third state.

FIG. 3 illustrates a back perspective view of the electronic device 100. As shown in FIG. 3, the electronic device 100 may be in a third state. In the third state, the telescoping arms 116 may be in a third position. In the third position, a size (e.g., a circumference) of the frame 104 of the electronic device 100 may be smaller in the third state than in the second state shown in FIG. 1. Furthermore, in the third position, the medial portion 128 may include a third length that is longer than the second length, as shown and described with respect to FIG. 2. As described previously, the electronic device 100 includes a cable guide 126 configured to guide movement of the optical fibers 120 and 122 as a position of the telescoping arms 116 is moved. As such, the cable guide 126 ensures that the bend 130 of the optical fibers 120 and 122 maintains the minimum bend radius.

Furthermore, the electronic device 100 includes one or more flexible circuits 140 and 141 that are coupled to the PCB 136 of the electronic device 100. In some examples, in the third state, the second portion 146 of the flexible circuit 140 may include a third length that is greater than the second length of the second portion 146 of the flexible circuit 140 when the electronic device 100 is in the second state. In some examples, the first portion 144 of the flexible circuit 140 may maintain a substantially consistent length, even as the second portion 146 changes lengths as a position of the telescoping arms 116 changes. In such a configuration, the flexible circuit 140 includes at least one bend 148 disposed between the first portion 144 and the second portion 146. Additionally, or alternatively, the flexible circuit 140 may include multiple bends disposed between the first portion 144 and the second portion 146. The one or more bends 148 may include a radius that is equal to or greater than a minimum bend radius of the flexible circuit.

Figure 4:
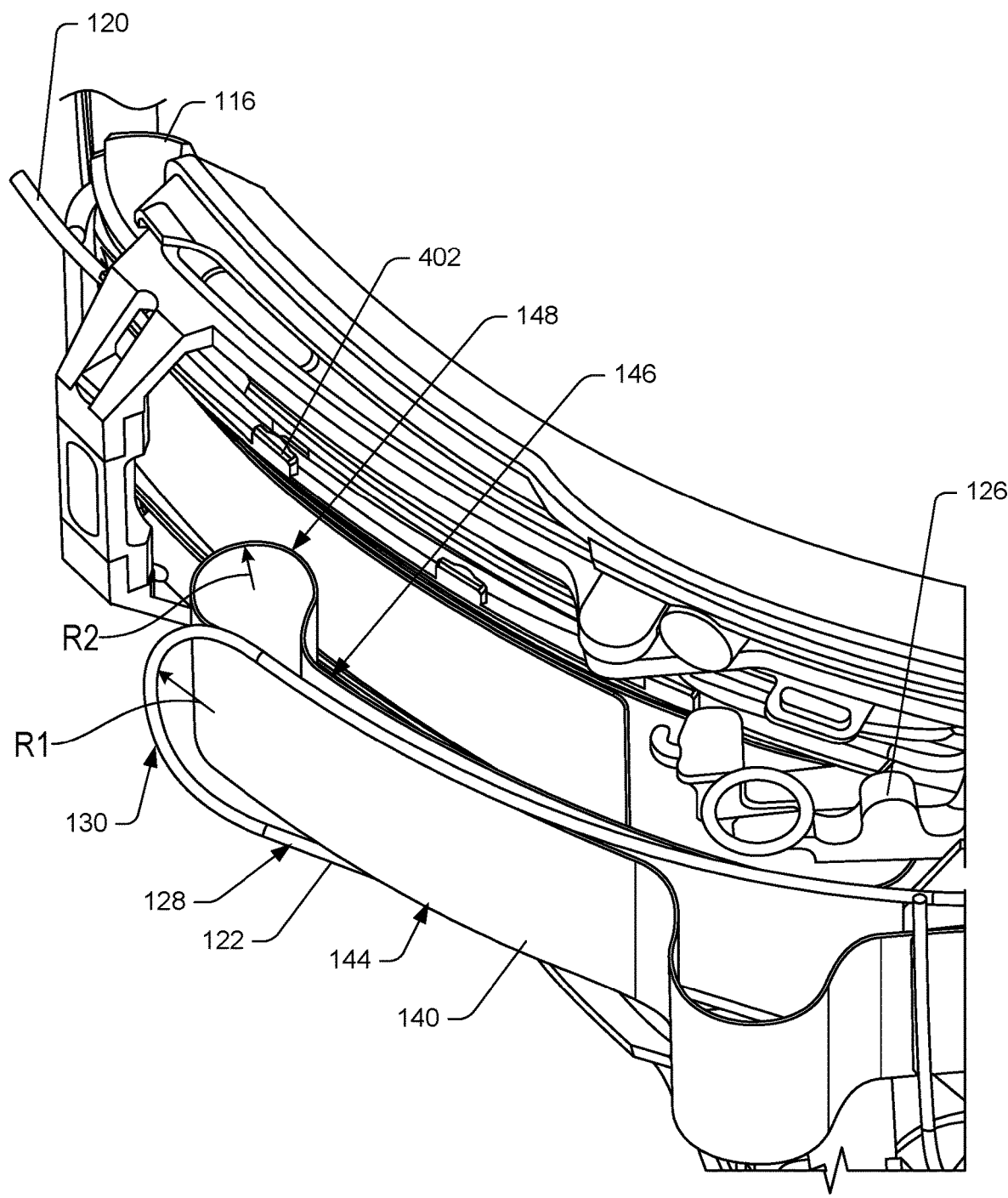
FIG. 4 illustrates a perspective view of a portion of the adjustable frame of the example electronic device of FIG. 1.

FIG. 4 illustrates a perspective view of a portion of the electronic device 100. As described previously, the optical fiber 120 may be coupled to the telescoping arm 116 and/or the front portion 106 of the electronic device 100. In some examples, the optical fiber 120 may be coupled to the telescoping arm 116 via one or more clips 402 that secure the optical fiber 120 thereto. In some examples, the one or more clips 402 may allow the optical fiber 120 to move along an axial length of the optical fiber 120. Alternatively, the one or more clips 402 may prevent and/or restrict movement of the optical fiber 120 in a direction along an axial length of the optical fiber 120.

As mentioned previously, the optical fiber 120 may include a medial portion 128 of the optical fiber 120. The medial portion 128 may include a segment of the optical fiber 120 that is disposed between the cable guide 126 and the connector 124. As described further herein, a length of the medial portion 128 may change based on a position of the telescoping arm 116.

In some examples, the medial portion 128 of the optical fiber 120 may include a bend 130 formed in the medial portion 128. The bend 130 is also located between the cable guide 126 and the connector 124 and the cable guide 126 may ensure that the bend maintains a minimum bend radius, even as a length of the medial portion 128 changes. For example, the bend 130 of the optical fiber 122 may include a radius (R1) that is substantially equal to or greater than a minimum bend radius.

In some examples, the flexible circuit 140 includes a first portion 144 and a second portion 146 disposed at least partially within the rear portion 112 of the electronic device 100. The second portion 146 may at least partially overlap the first portion 144 and the second portion 146 may be configured to move relative to the first portion 144 as the telescoping arm 116 moves relative to the telescoping arm guide 118. In such a configuration, the flexible circuit 140 includes at least one bend 148 disposed between the first portion 144 and the second portion 146. Additionally, or alternatively, the flexible circuit 140 may include multiple bends disposed between the first portion 144 and the second portion 146. The bend 148 may include a radius (R2) that is equal to or greater than a minimum bend radius of the flexible circuit 140.

Figure 5:
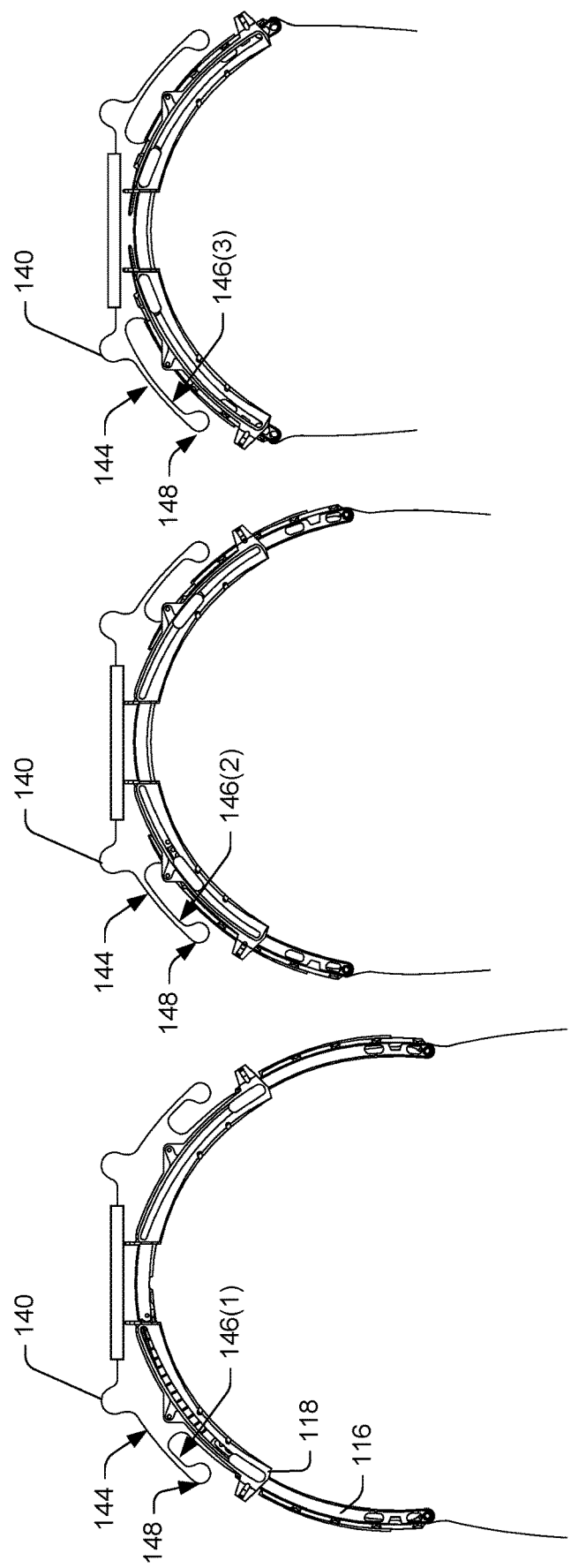
FIGS. 5A-5C illustrate a top-down view of the adjustable frame of the example electronic device of FIG. 1 in various states of adjustment.

FIGS. 5A-5C illustrates a top view of the electronic device 100. FIG. 5A depicts the electronic device 100 in the first state. In the first state, the telescoping arms 116 are in a first position. Furthermore, as mentioned previously, the second portion 146(1) may include a first length in the first state when the telescoping arms 116 are in the first position. FIG. 5B depicts the electronic device 100 in the second state. In the second state, the telescoping arms 116 are in a second position. In some examples, the second portion 146(2) of the flexible circuit 140 may include a second length in the second state, where the second length is greater than the first length. FIG. 5C depicts the electronic device 100 in the third state. In the third state, the telescoping arms 116 are in a third position. In some examples, the second portion 146(2) of the flexible circuit 140 may include a third length in the third state, where the third length is greater than the second length. As such, FIGS. 5A-5C depict a process of adjusting a position of the telescoping arms 116 and further shows how the second portion 146 of the flexible circuit 140 moves relative to the first portion 144 in order to maintain a minimum bend radius in the bend 148 of the flexible circuit.

Figure 6:
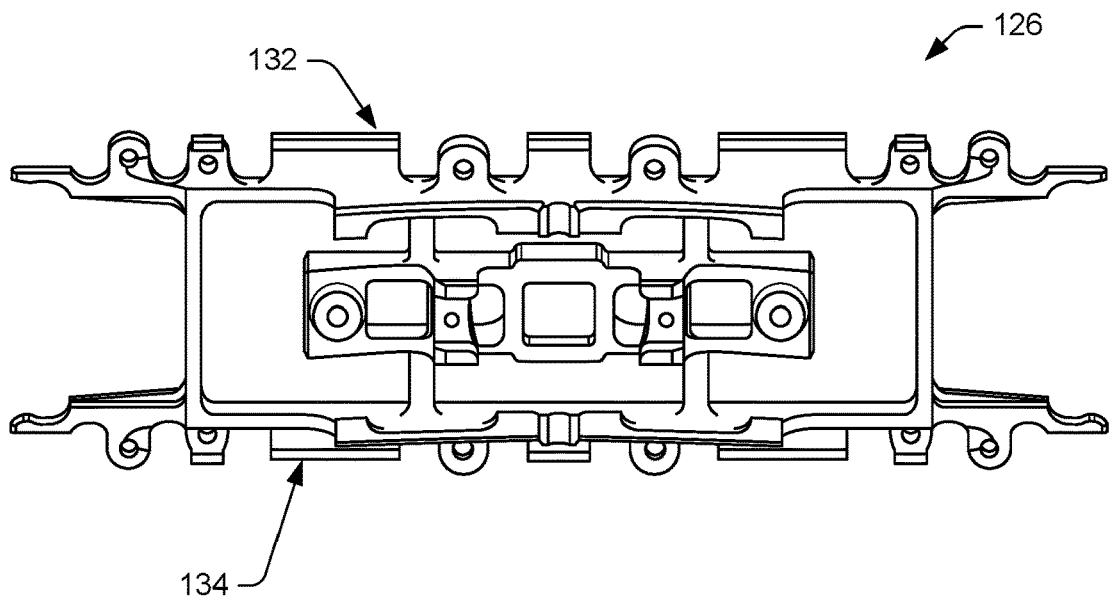
FIG. 6 illustrates a front perspective view of an example cable guide of a hardware management system in accordance with an example of the present disclosure.

FIG. 6 illustrates a front perspective view of the cable guide 126 of the electronic device 100. As mentioned previously, the cable guide 126 may include a top portion 132 and a bottom portion 134. In some examples, the first optical fiber 120 may be secured within the top portion 132 of the cable guide 126 and the second optical fiber 122 may be secured within the bottom portion 134 of the cable guide 126.

As mentioned previously, the cable guide 126 may be formed from a relatively low friction polymer that allows the optical fiber 120 to move in at least one direction (e.g., along an axis of the optical fiber), while the cable guide 126 directs the movement of the optical fiber 120 in the at least one direction. The polymer may include polyoxymethylene (POM) or other low friction polymer.

Figure 7:
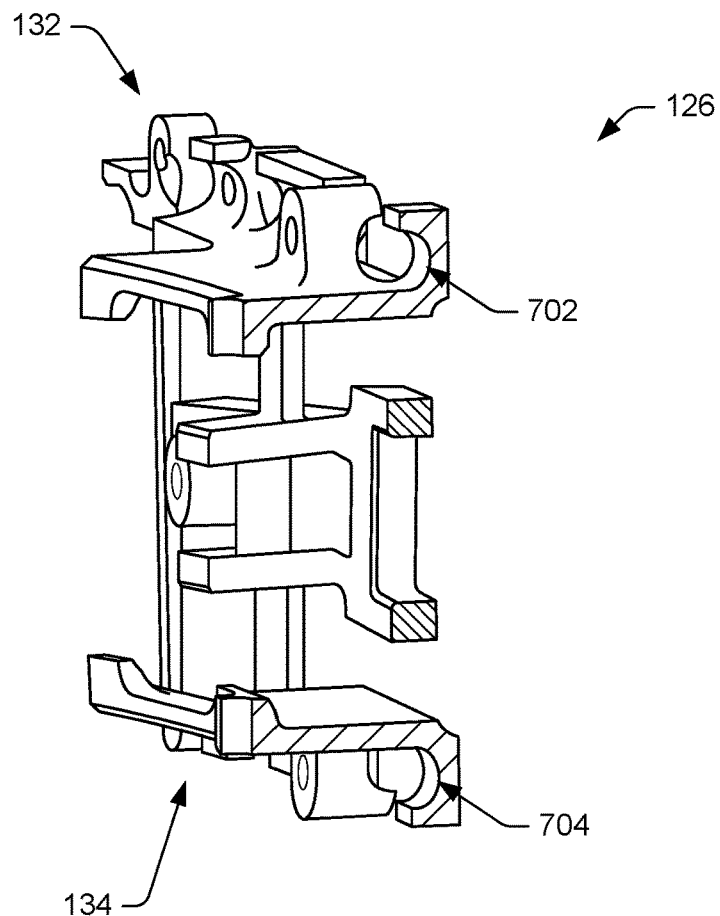
FIG. 7 illustrates a perspective sectional view of an example cable guide of a hardware management system in accordance with an example of the present disclosure.

FIG. 7 illustrates a perspective sectional view of the cable guide 126. In some examples, the top portion 132 of the cable guide 126 may include a first cable pathway 702 through which the first optical fiber 120 may be inserted and slidably secured within. Likewise, the bottom portion 134 of the cable guide 126 may include a second cable pathway 704 through which the second optical fiber 122 may be inserted and slidably secured within.

Figure 8:
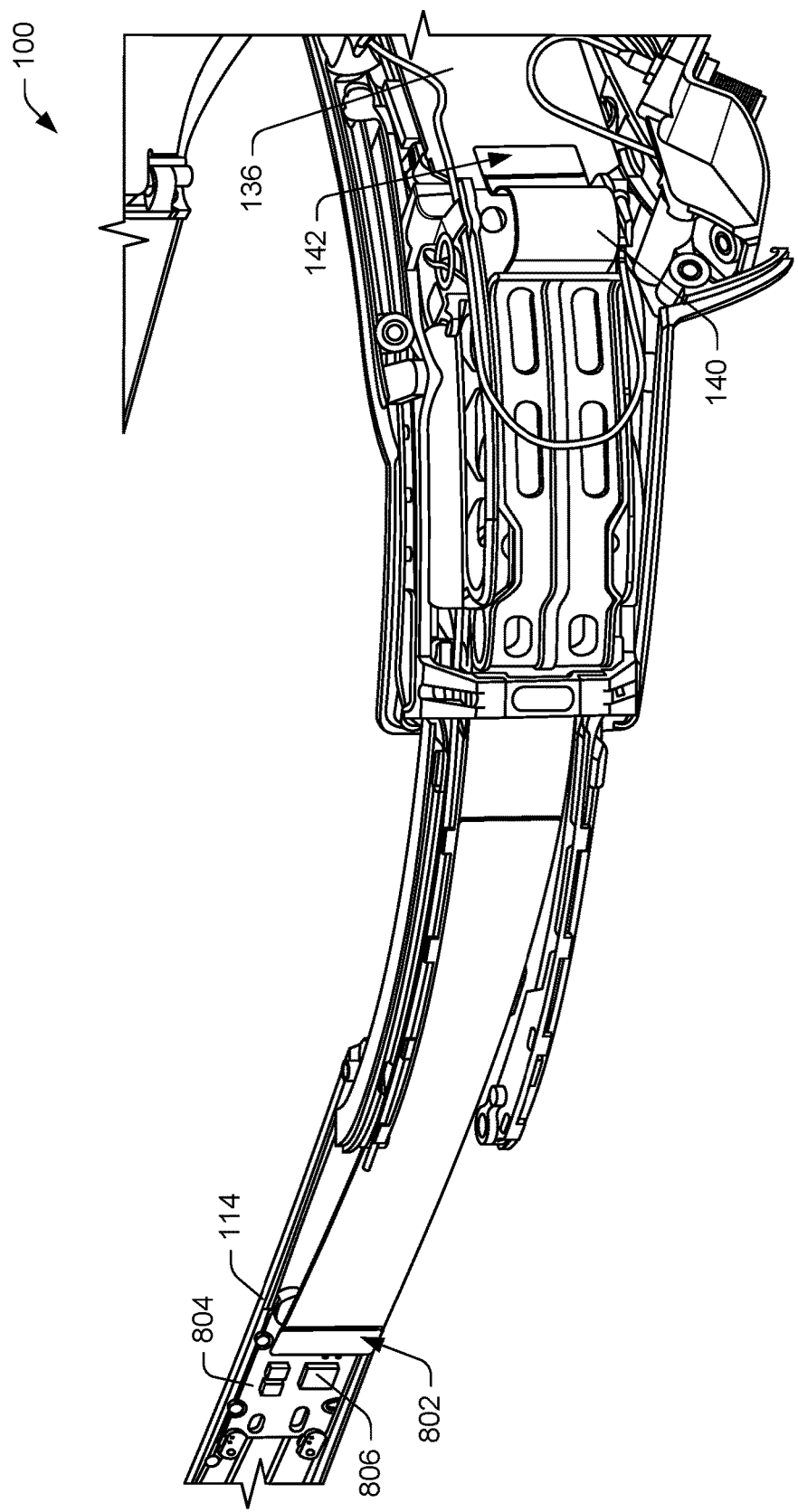
FIG. 8 illustrates a perspective view of a flexible circuit management system of a hardware management system in accordance with an example of the present disclosure.

FIG. 8 illustrates a perspective view of a portion of the electronic device 100. As mentioned previously, the flexible circuit 140 may be coupled to the PCB 136 at a first end 142 of the flexible circuit 140 and electrically coupled to the one or more electronic components 138 that are mounted on the PCB 136. The flexible circuit 140 may include a second end 802 that is coupled to the telescoping arm 116. Additionally, or alternatively, the electronic device 100 may include another PCB 804 disposed within the intermediate portion 114 of the electronic device 100. In such an example, the flexible circuit 140 may be coupled to the PCB 804 disposed within the intermediate portion 114 instead of or in addition to the telescoping arm 116. In some examples, the PCB 804 disposed within the intermediate portion 114 may include one or more electronic components 806 (e.g., radios, antennas, processors, display drivers, resistors, capacitors, battery management modules, etc.) that are configured to receive data via the flexible circuit 140 and provide data to be output by the electronic device 100.

Figure 9:
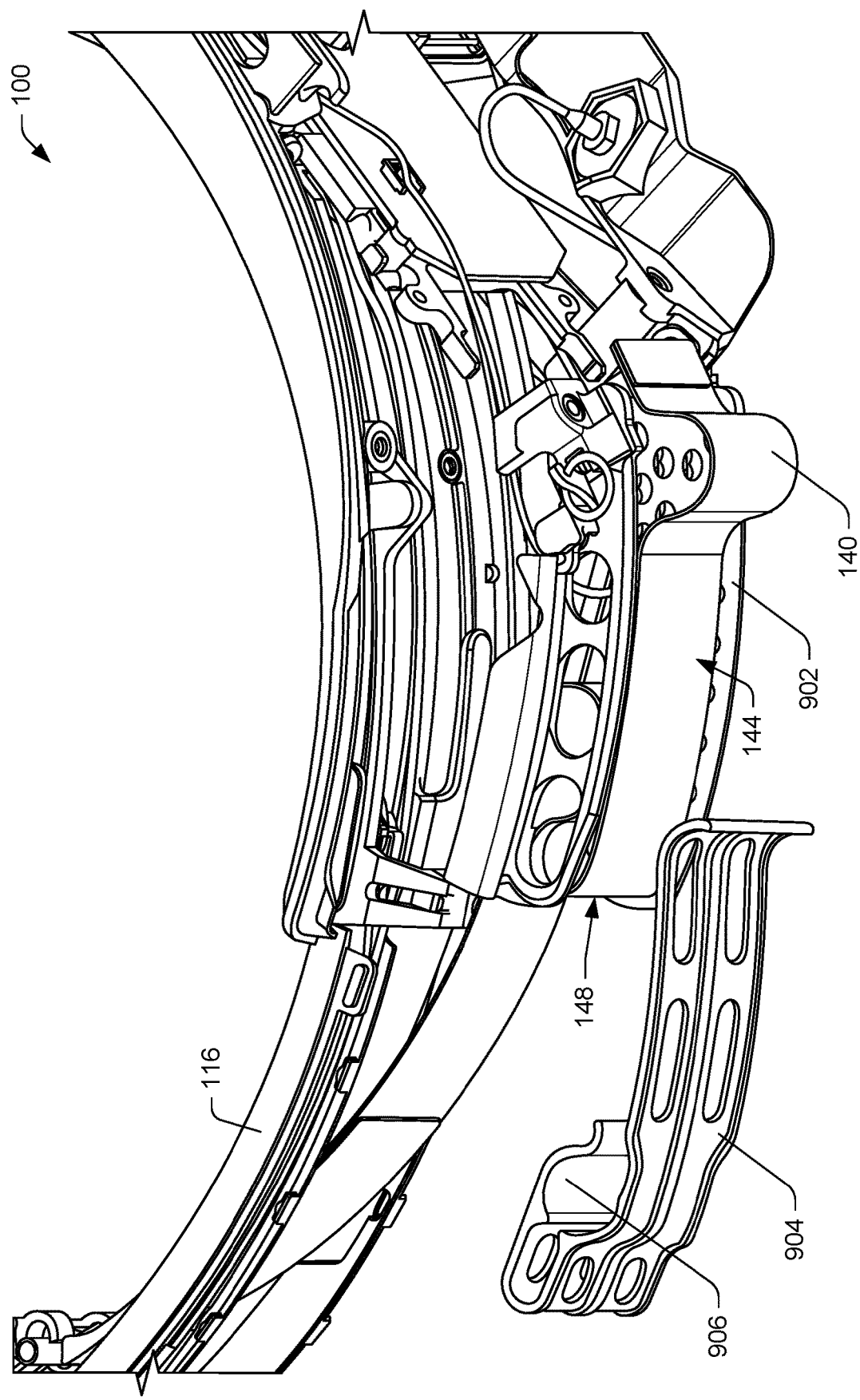
FIG. 9 illustrates a perspective view of a flexible circuit management system of a hardware management system with a flexible circuit clamp being removed in accordance with an example of the present disclosure.

FIG. 9 illustrates a perspective view of a portion of the electronic device 100. FIG. 9 depicts one or more components that may ensure that the flexible circuit 140 maintains the minimum bed radius, even as positions of the telescoping arms 116 change. For example, the electronic device 100 may include a flexible circuit guide 902 configured to support at least a portion of the first portion 144 of the flexible circuit 140. The electronic device 100 may further include a flexible circuit clamp 904 coupled to the flexible circuit guide 902 and configured to restrict movement of the flexible circuit 140 between the flexible circuit guide 902 and the flexible circuit clamp 904. In some examples, the flexible circuit clamp 904 includes a rounded portion 906 configured to accommodate the bend 148 of the flexible circuit.

CONCLUSION

Although the discussion above sets forth example implementations of the described techniques and structural features, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. For example, the structural features and/or methodological acts may be rearranged and/or combined with each other and/or other structural features and/or methodological acts. In various examples, one or more of the structural features and/or methodological acts may be omitted.

What is claimed is:

1. A headset comprising:
a front portion configured to engage a front of a head of a user;
a rear portion configured to engage a rear of the head of the user, the rear portion being a coupled to the front portion and the rear portion including:
a telescoping arm guide;
a telescoping arm slidably coupled to the telescoping arm guide such that the telescoping arm is moveable relative to the telescoping arm guide;
a cable guide coupled to the telescoping arm guide; and
a connector; and
an optical fiber coupled to the telescoping arm at a first point, coupled to the connector at a second point, and slidably coupled to the cable guide between the first point and the second point, such that the optical fiber includes a medial portion having a bend between the cable guide and the second point, wherein:
in a first state, the telescoping arm is in a first position, the medial portion includes a first length, and the bend is greater than or equal to a minimum bend radius, and
in a second state, the telescoping arm is in a second position, the medial portion includes a second length, and the bend is greater than or equal to the minimum bend radius, the second length being less than the first length.

2. The headset of claim 1, wherein the rear portion further includes:
a printed circuit board; and
a flexible circuit having a first end coupled to the printed circuit board and a second end coupled to the telescoping arm such that the flexible circuit includes:
a first portion;
a second portion that at least partially overlaps the first portion, the second portion configured to move relative to the first portion; and
a bend disposed between and connecting the first portion and the second portion.

3. The headset of claim 2, wherein the minimum bend radius is a first minimum bend radius and the bend of the flexible circuit is greater than or equal to a second minimum bend radius that is less than the first minimum bend radius.

4. The headset of claim 2, further comprising:
a flexible circuit guide configured to support at least a portion of the first portion of the flexible circuit;
a flexible circuit clamp coupled to the flexible circuit guide and configured to restrict movement of the flexible circuit between the flexible circuit guide and the flexible circuit clamp, the flexible circuit clamp including a rounded portion configured to accommodate the bend of the flexible circuit.

5. The headset of claim 1, wherein the front portion includes a display, the optical fiber is coupled to the display, and the optical fiber is configured to convey a signal to the display.

6. The headset of claim 1, further comprising an adjustment mechanism that is configured to adjust a position of the telescoping arm when the adjustment mechanism is rotated.

7. The headset of claim 6, wherein the optical fiber is looped at least partially around the adjustment mechanism.

8. A wearable device comprising:
a front portion configured to engage a front portion of a head of a user;
a rear portion configured to engage a rear portion of the head of the user, the rear portion being at least partially coupled to the front portion and the rear portion including:
a telescoping arm guide;
a telescoping arm slidably coupled to the telescoping arm guide such that the telescoping arm is moveable relative to the telescoping arm guide;
a cable guide coupled to the telescoping arm guide; and
a connector; and
an optical fiber coupled to the telescoping arm at a first point, coupled to the connector at a second point, and slidably coupled to the cable guide between the first point and the second point, such that the optical fiber includes a medial portion between the first point and the second point, the medial portion including a bend that is greater than or equal to a minimum bend radius.

9. The wearable device of claim 8, wherein in a first state, the telescoping arm is in a first position, the medial portion includes a first length, and the bend is greater than or equal to the minimum bend radius.

10. The wearable device of claim 9, wherein in a second state, the telescoping arm is in a second position, the medial portion includes a second length, and the bend is greater than or equal to the minimum bend radius, the second length being less than the first length.

11. The wearable device of claim 8, wherein the front portion includes a display, the optical fiber is coupled to the display, and the optical fiber is configured to convey a signal to the display.

12. The wearable device of claim 8, wherein the optical fiber is coupled to the telescoping arm via one or more clips.

13. The wearable device of claim 8, wherein the front portion and the rear portion form a frame of the wearable device and the telescoping arm is moveable to adjust a size of the frame to accommodate the head of the user.

14. The wearable device of claim 8, wherein the rear portion further includes:
a printed circuit board; and
a flexible circuit having a first end coupled to the printed circuit board and a second end coupled to the telescoping arm such that the flexible circuit includes:
  a first portion;
  a second portion that at least partially overlaps the first portion, the second portion configured to move relative to the first portion; and
  a bend disposed between and connecting the first portion and the second portion.

15. The wearable device of claim 14, wherein the minimum bend radius is a first minimum bend radius, and the bend of the flexible circuit is greater than or equal to a second minimum bend radius that is less than the first minimum bend radius.

16. The wearable device of claim 14, further comprising:
a flexible circuit guide configured to support at least a portion of the first portion of the flexible circuit;
a flexible circuit clamp coupled to the flexible circuit guide and configured to restrict movement of the flexible circuit between the flexible circuit guide and the flexible circuit clamp, the flexible circuit clamp including a rounded portion configured to accommodate the bend of the flexible circuit.

17. A wearable device comprising:
an adjustable frame including:
  a telescoping arm guide;
  a telescoping arm slidably coupled to the telescoping arm guide such that the telescoping arm is moveable relative to the telescoping arm guide;
  a cable guide coupled to the telescoping arm guide; and
  a connector; and
an optical fiber coupled to the telescoping arm at a first point, coupled to the connector at a second point, and slidably coupled to the cable guide between the first point and the second point, such that the optical fiber includes a medial portion between the first point and the second point, the medial portion including a bend that is greater than or equal to a first minimum bend radius.

18. The wearable device of claim 17, further comprising:
a printed circuit board; and
a flexible circuit having a first end coupled to the printed circuit board and a second end coupled to the telescoping arm such that the flexible circuit includes a bend disposed between the first end and the second end, the bend of the flexible circuit being is greater than or equal to a second minimum bend radius.

19. The wearable device of claim 17, wherein the telescoping arm is movable to adjust a size of the adjustable frame to accommodate a head of a user.

20. The wearable device of claim 17, further comprising an adjustment mechanism that is configured to adjust a position of the telescoping arm when the adjustment mechanism is rotated, wherein the optical fiber is looped at least partially around the adjustment mechanism.

* * * * *